United States Patent
Zhao (10) Patent No.: US 11,203,004 B1
(45) Date of Patent: Dec. 21, 2021

(54) SYSTEMS AND METHODS FOR AEROGEL PREPARATION VIA VACUUM-ASSISTED SOLVENT EXCHANGE AND AMBIENT PRESSURE DRYING

(71) Applicant: Ford Global Technologies, LLC, Dearborn, MI (US)

(72) Inventor: Haibo Zhao, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/001,955

(22) Filed: Aug. 25, 2020

(51) Int. Cl.
| | |
|---|---|
| *C08J 9/28* | (2006.01) |
| *C08J 3/075* | (2006.01) |
| *B01J 13/00* | (2006.01) |
| *B62D 29/04* | (2006.01) |
| *B60R 16/04* | (2006.01) |

(52) U.S. Cl.
CPC .......... *B01J 13/0091* (2013.01); *B62D 29/04* (2013.01); *C08J 3/075* (2013.01); *C08J 9/28* (2013.01); *B60R 16/04* (2013.01); *C08J 2205/026* (2013.01)

(58) Field of Classification Search
CPC . B01J 13/0091; C08J 3/075; C08J 9/28; C08J 2205/026; B62D 29/04; B60R 16/04
See application file for complete search history.

(56) References Cited

U.S. PATENT DOCUMENTS

| | | | |
|---|---|---|---|
| 9,216,909 B2 | 12/2015 | Fukuju et al. | |
| 10,227,469 B1 | 3/2019 | Williams et al. | |
| 2004/0132845 A1* | 7/2004 | Rhine | B01J 13/0091 521/82 |
| 2009/0035344 A1* | 2/2009 | Thomas | C08J 3/075 424/423 |
| 2011/0245362 A1* | 10/2011 | Hwang | C08K 5/13 521/180 |
| 2018/0112054 A1 | 4/2018 | Steiner, III et al. | |

OTHER PUBLICATIONS

Meador et al., "Mechanically Strong, Flexible Polyimide Aerogels Cross-Linked with Aromatic Triamine," from Applied Materials and Interfaces, ACS Publications, Jan. 10, 2012, pp. 536-544 (Year: 2012).*

Egeberg et al., "Freeze drying of silica gels prepared from siliciumethoxid," Journal de Physique Colloques, 1989, 50 pages C4-23 to C4-28. (Year: 1989).*

* cited by examiner

*Primary Examiner* — Kara B Boyle
(74) *Attorney, Agent, or Firm* — Geoffrey Brumbaugh; McCoy Russell LLP (57) ABSTRACT

Systems and methods are provided for aerogel processing and production via vacuum-assisted solvent exchange and ambient pressure drying. In one example, a method includes injecting a solvent at each of a top surface and a base of a saturated aerogel and applying a vacuum-assisted pressure differential across the saturated aerogel to achieve solvent exchange. In some examples, following solvent exchange, the aerogel may be dried in ambient pressure and integrated in a vehicle component. In this way, a rate of solvent exchange may be increased, concomitantly increasing aerogel production efficiency. Further, in some examples, the aerogel may be protected from premature drying during solvent exchange.

20 Claims, 5 Drawing Sheets

SYSTEMS AND METHODS FOR AEROGEL PREPARATION VIA VACUUM-ASSISTED SOLVENT EXCHANGE AND AMBIENT PRESSURE DRYING

FIELD

The present description relates generally to systems and methods for preparation of aerogels, particularly via vacuum-assisted solvent exchange and ambient pressure drying.

BACKGROUND/SUMMARY

Aerogels may be integrated in components for numerous applications to provide desirable insulating properties without significantly increasing component size or weight. Specifically, because greater than 99% of a volume of a given aerogel may be occupied by air, aerogels may have a relatively low density and a relatively large specific area.

An exemplary aerogel may include a nano- or microporous network formed from an ethanol-based sol-gel process. Following the sol-gel process, ethanol may permeate/saturate pores of a resultant structure. Relatively weak structural motifs combined with increased surface tension during liquid-to-gas phase transitions may result in degradation of the porous network during drying, compromising the desirable properties of the finally-formed aerogel. Though the liquid-to-gas phase transitions may be circumvented via supercritical drying, equipment therefor may prove cost prohibitive and inefficient for mass scale production.

Accordingly, the ethanol may be exchanged with a solvent which subjects the porous network to lower overall surface tension during drying. By lowering the overall surface tension, drying may instead be conducted in ambient pressures without overly specialized equipment. Further, surface modification reactants may be carried by the solvent to strengthen surface structures within the porous network, for example, by increasing hydrophobicity of the aerogel. However, lengthy processing times are associated with ambient pressure drying (e.g., from multiple solvent exchange and surface modification iterations to ensure sufficient percolation of the porous network), lowering an overall production rate on a mass scale.

Other attempts to reduce processing duration for ambient pressure drying include exerting an applied pressure during solvent exchange. One example approach is shown by Steiner et al. in U.S. Patent Application Publication No. 2018/0112054. Another example approach is shown by Fukuju et al. in U.S. Pat. No. 9,216,909. In both Steiner and Fukuju, application of pressure is disclosed as increasing a rate of solvent exchange. Still other examples employ agitation to facilitate solvent exchange.

However, the inventors herein have recognized potential issues with such systems. As one example, substantially vacant pores may be generated during solvent exchange (e.g., after an occupying solvent is forced out via the applied pressure, but before another solvent percolates to the newly vacant pores). The vacant pores may induce contraction and degradation of the porous network, potentially blocking a solvent flow path. Further, by agitating an aerogel or by applying a positive pressure at a top surface of the aerogel without generating a corresponding negative pressure at a base of the aerogel, control of flow rates and solvent percolation among the pores may be limited to adjustment of a single degree of freedom.

In one example, the issues described above may be addressed by a method for processing an aerogel saturated with a first solvent, the method including injecting a second solvent at each of a top surface and a base of the aerogel, and applying a vacuum-assisted pressure differential across the aerogel to exchange the first solvent with the second solvent. In this way, a flow rate of each of the first and second solvents during solvent exchange may be increased while mitigating degradation of the aerogel, reducing a duration of aerogel processing for ambient pressure drying.

As one example, the aerogel saturated with the first solvent may be positioned in a first vessel having a plurality of solvent injection ports fluidly coupled thereto. At least one of the plurality of solvent injection ports may inject the second solvent in a volume of the first vessel not occupied by the aerogel (e.g., above the top surface). Remaining solvent injection ports may inject the second solvent directly into a base of the aerogel (e.g., the aerogel may be positioned such that the base is directly adjacent to the remaining solvent injection ports). In this way, premature drying of the base of the aerogel may be obviated.

A second vessel may be fluidly coupled to the first vessel. At least one pressure differential valve may further be fluidly coupled to each of the first and second vessels. The at least one pressure differential valve fluidly coupled to the first vessel may apply a pressure at a gas-liquid interface of the second solvent to increase a flow rate thereof and induce the second solvent into the aerogel. Simultaneously, the at least one pressure differential valve fluidly coupled to the second vessel may generate a vacuum therein to increase a flow rate of the first solvent and induce the first solvent out of the aerogel. The vacuum-assisted pressure differential may thus be generated as a result of a difference between the pressure and the vacuum. In this way, substantially continuous and adjustable solvent exchange in the aerogel may be realized via application of the vacuum-assisted pressure differential thereacross.

In some examples, following subsequent ambient pressure drying, the aerogel may be integrated in a vehicle component. In additional or alternative examples, the first solvent may be collected in the second vessel during solvent exchange for reclamation (e.g., via distillation). The reclaimed first solvent may then be used for processing of additional aerogels. In this way, by increasing the flow rate of each of the first and second solvents through the aerogel and by recycling at least the first solvent for additional aerogel processing, mass-scale production of vehicle components including aerogels dried in ambient pressures may be realized at reduced cost and increased efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2A:
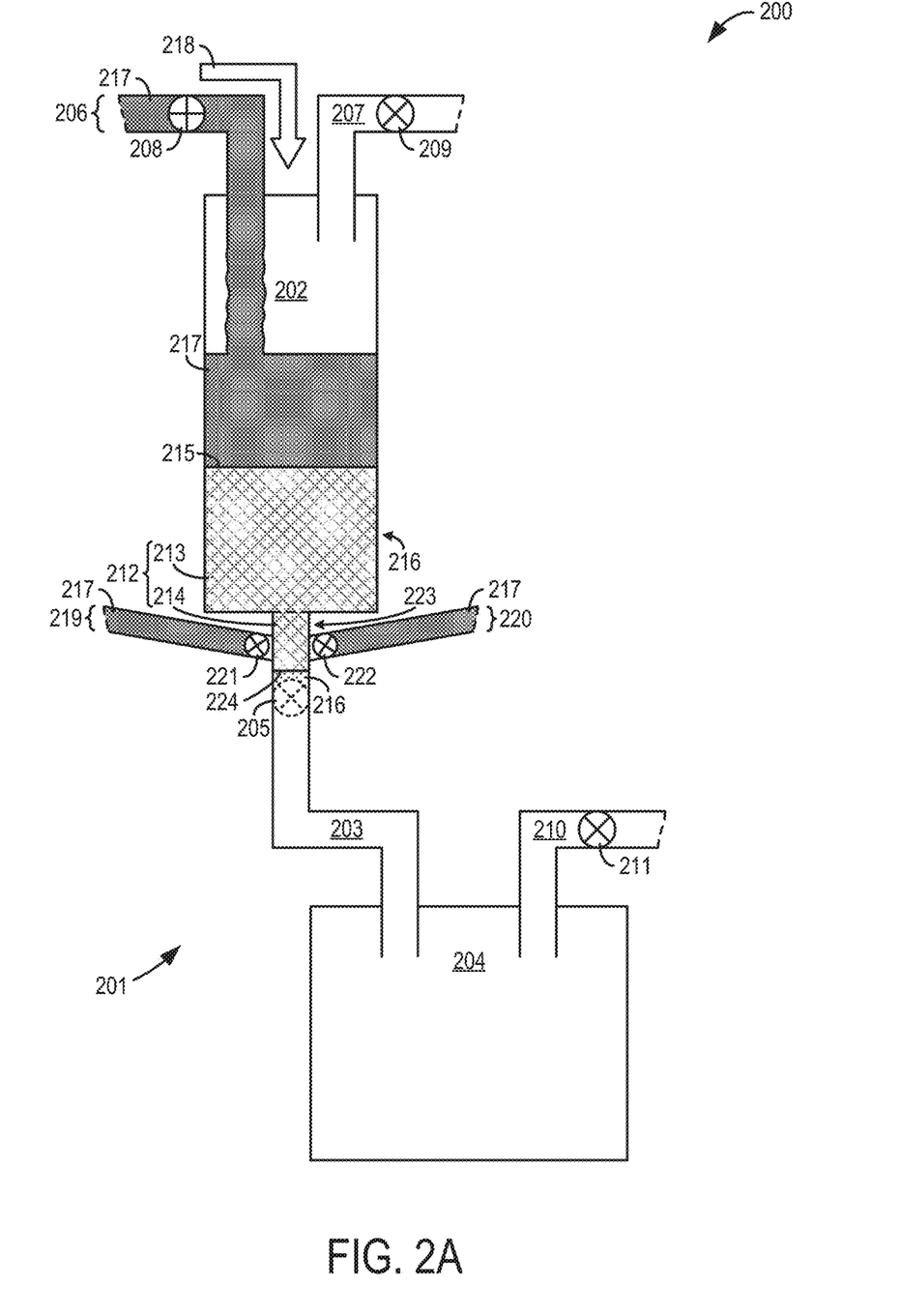
FIGS. 2A-2C show schematic diagrams of a vacuum-assisted solvent exchange process for a saturated aerogel.
Figure 2B:
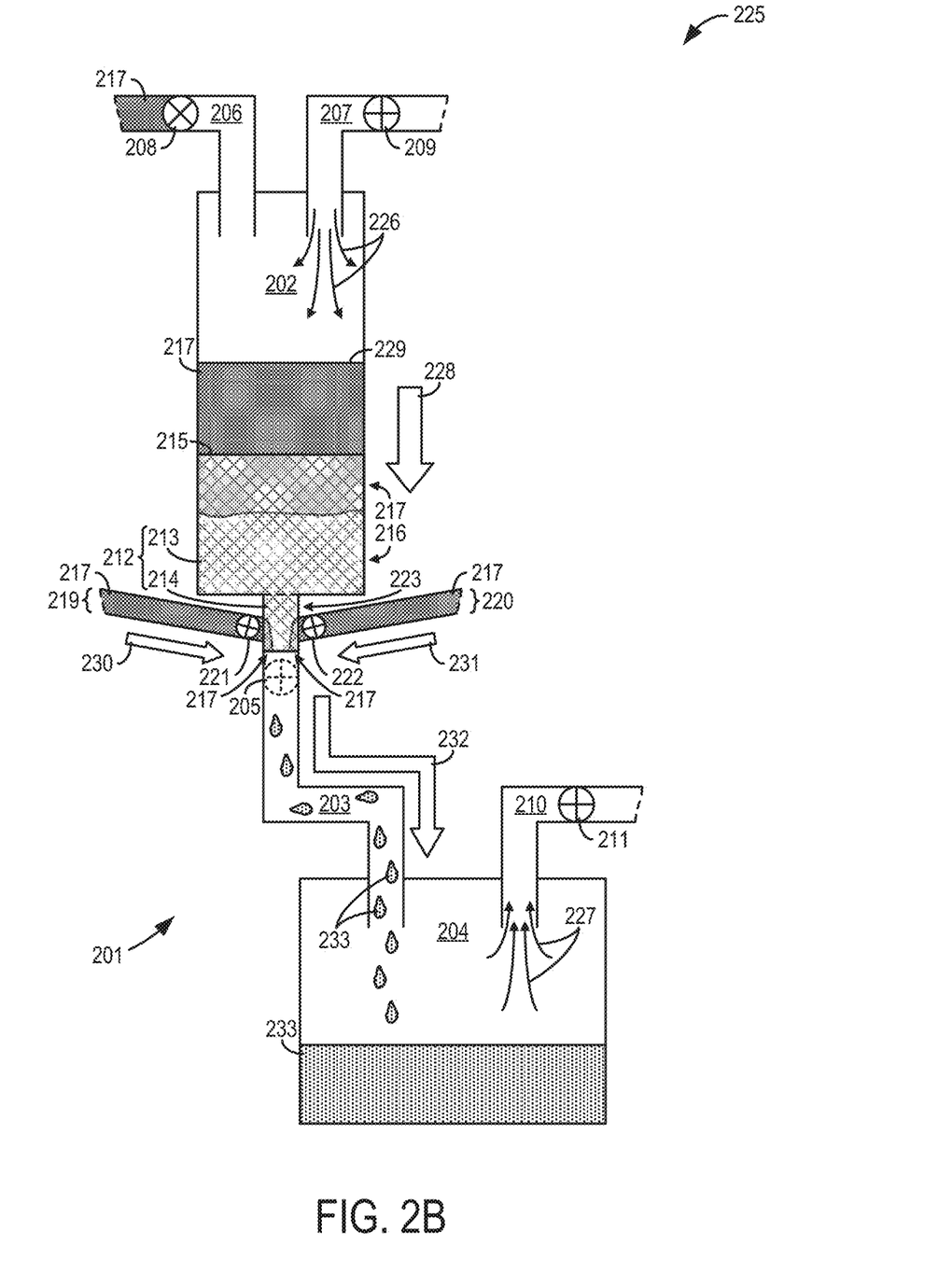
Figure 2C:
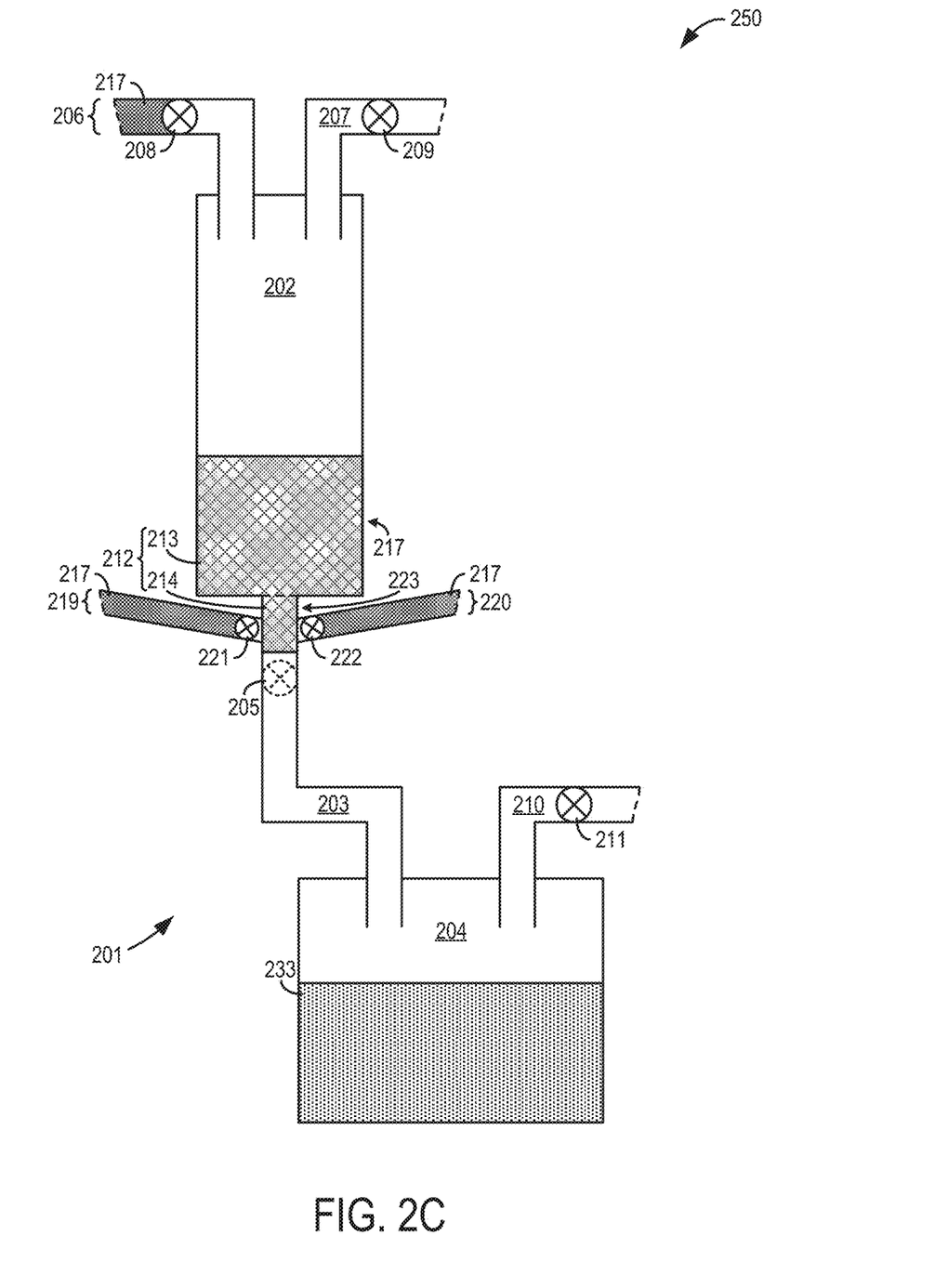
Figure 3:
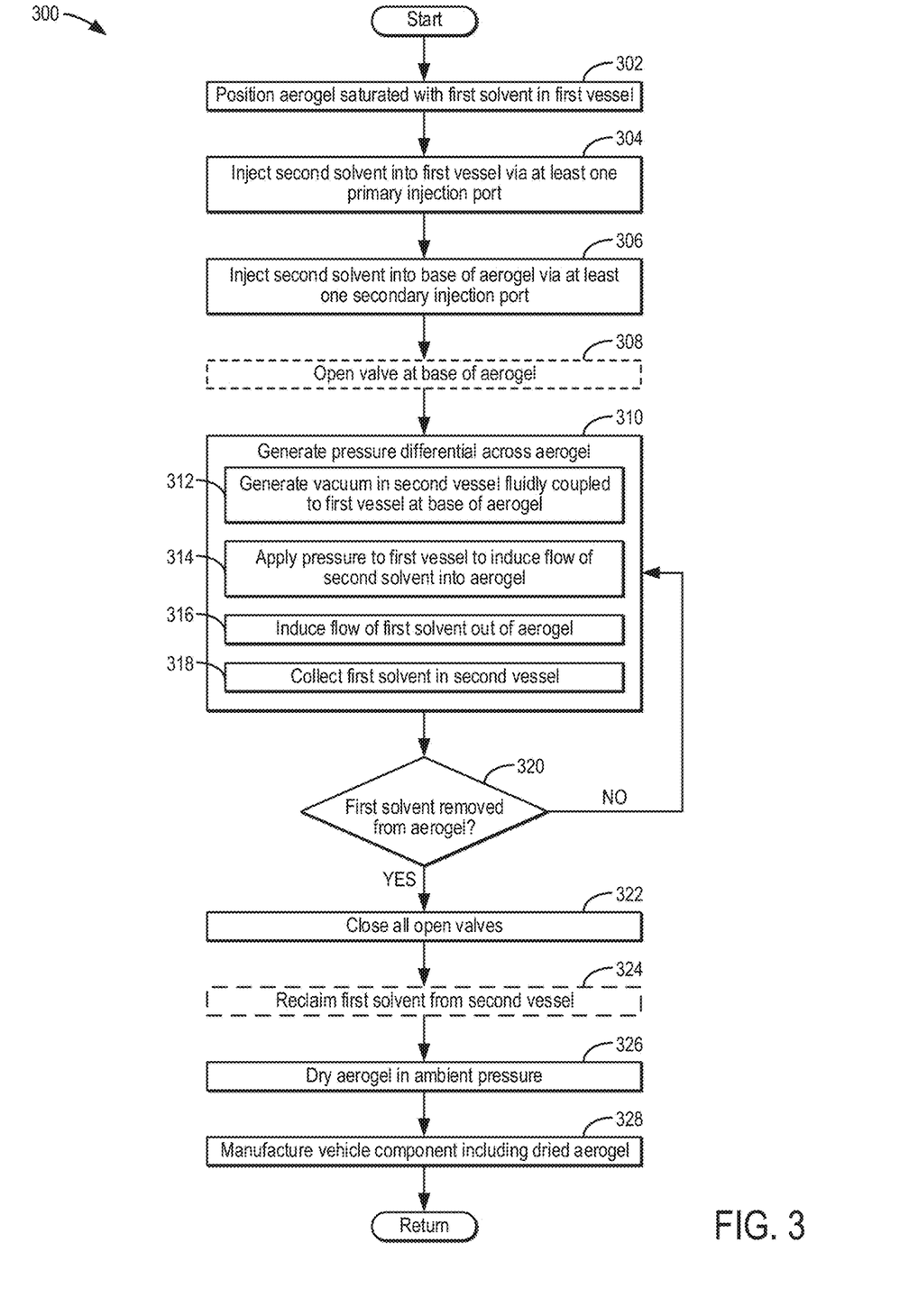
FIG. 3 shows a flow chart of a method for vacuum-assisted solvent exchange and ambient pressure drying of an aerogel and subsequent manufacturing of a vehicle component including the aerogel.

The following description relates to systems and methods for processing aerogels via vacuum-assisted solvent exchange and ambient pressure drying. A reaction system may include applying a vacuum-assisted pressure differential across an aerogel while maintaining a threshold solvent saturation of the aerogel. One exemplary vacuum-assisted solvent exchange process and reaction system therefor is schematically depicted in FIGS. 2A-2C. After processing, the aerogels may be integrated in one or more components for a vehicle, such as the exemplary vehicle depicted in FIG. 1. FIG. 3 further shows one exemplary method of aerogel processing and subsequent manufacturing of the one or more components for the vehicle.

Figure 1:
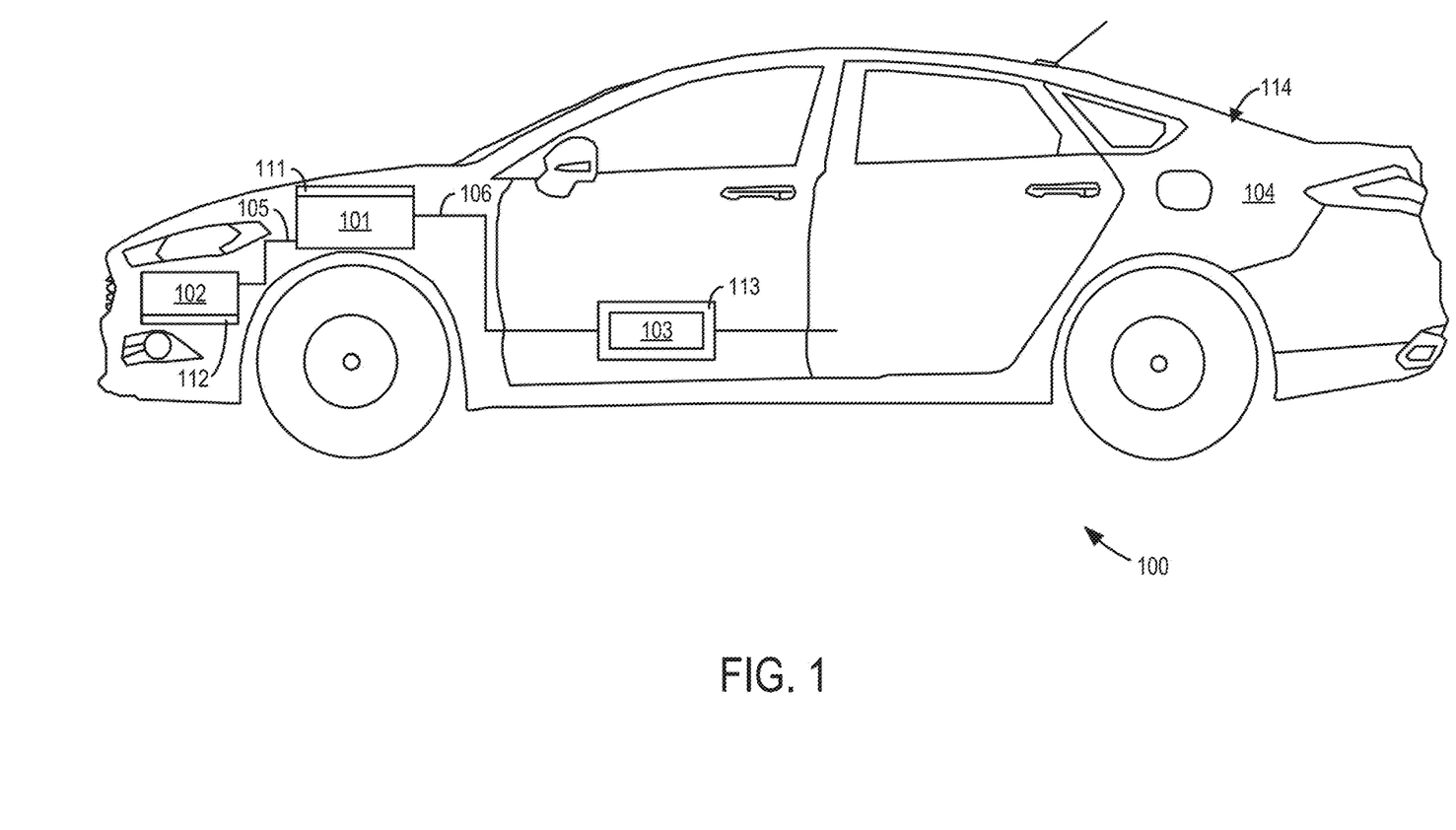
FIG. 1 shows a schematic diagram of a vehicle including one or more aerogel-based vehicle components.

Referring now to FIG. 1, a vehicle 100 is depicted. The vehicle 100 may include an engine 101, which may be electrically coupled to a battery 102 via an electrical line 105 and fluidly coupled to an emissions treatment device 103 via an exhaust passage 106. As shown, the engine 101 may be configured with an engine cover 111. The engine cover 111 may provide at least some protection to the engine 101 (e.g., from contact pressure exerted on components therein), as well as thermal insulation (either to retain heat or to protect a vehicle operator or other components of the vehicle 100).

The battery 102 may be a traction battery (e.g., for electric or hybrid-electric propulsion) or an auxiliary battery (e.g., for powering auxiliary systems of the vehicle 100). As further shown, the battery 102 may be configured with a battery tray 112. The battery tray 112 may retain the battery 102 in position relative to other components of the vehicle 100 and may provide thermal insulation (e.g., to protect the battery 102 from external heat sources).

The emissions treatment device 103 may include one or more catalysts, filters, or traps configured as flow-through monoliths for emissions treatment of exhaust gas passing thereacross via the exhaust passage 106. As shown, the emissions treatment device 103 may be configured with a housing 113 (also referred to herein as a "catalyst housing"). The catalyst housing 113 may provide at least some protection to the emissions treatment device 103 (e.g., from contact pressure exerted on the emissions treatment device 103), as well as thermal insulation (either to retain heat or to protect a vehicle operator or other components of the vehicle 100).

The vehicle 100 may include a vehicle body 104 coated with one or more coatings 114. For example, the one or more coatings 114 may include paint (e.g., for aesthetic appearance, protecting the vehicle body 104 from oxidation, etc.) and/or a thermal insulation coating applied thereto (e.g., to reflect or divert at least some heat from entering an interior of the vehicle 100).

Aerogels constitute one exemplary class of thermally-insulating materials which may be integrated into one or more vehicle components. Having a relatively large specific surface area and a relatively low density, aerogels and aerogel-based materials may be desirable for manufacturing lightweight, thermally-insulating vehicle components. However, some aerogel processing methods may be cost-prohibitive, inefficient, and/or may result in substandard porous network structures. Production of high-quality aerogels on a mass scale may therefore be difficult to achieve with such aerogel processing methods.

In one example, the vehicle 100 may include aerogels processed via vacuum-assisted solvent exchange and ambient pressure drying as thermally insulating materials. As described above, the aerogels may be integrated into one or more vehicle components, such as the engine cover 111, the battery tray 112, the catalyst housing 113, and at least one of the one or more coatings 114. As discussed in detail below with reference to FIGS. 2A-3, by preparing aerogels via vacuum-assisted solvent exchange, flow rates of the solvents may be increased, thereby decreasing an overall processing duration. Decreasing the overall processing duration in this way may correspondingly improve a feasibility of ambient pressure drying, as solvent exchange and related surface modification processes may be key to reducing an overall surface tension of the aerogels during ambient pressure drying. Further, in some examples, solvent saturation may be maintained throughout the vacuum-assisted solvent exchange, such that a porous network of the aerogel may be preserved with a high degree of fidelity.

Referring now to FIGS. 2A-2C, schematic diagrams 200, 225, 250 are respectively depicted, illustrating steps of a vacuum-assisted solvent exchange process for an aerogel 212 saturated with a first solvent 216. The steps may be carried out via components of a reaction system 201, which may include a first vessel or chamber 202 for solvent exchange fluidly coupled via a solvent recollection line 203 to a second vessel or chamber 204 for solvent recollection.

As shown in the schematic diagram 200 of FIG. 2A, the aerogel 212 saturated with the first solvent 216 may be positioned within the first vessel 202. In some examples, the aerogel 212 may be partitioned into a top region 213 and a base region 214. As shown, the aerogel 212 may be packed into the first vessel 202 such that the base region 214 may extend into a narrow section 223 of the first vessel 202 coupled to the solvent recollection line 203.

In some examples, the aerogel 212 may be a nano- or micro-porous network formed from condensation reactions of silica-based units, where the condensation reactions may occur in bulk quantities of the first solvent 216. The first solvent 216 may be selected so as to be miscible in both silica and water, thereby facilitating the condensation reactions. In some examples, the first solvent 216 may include a compound with at least one hydrophilic functional group. For example, the first solvent 216 may include one or more polar compounds, such as methanol, ethanol, acetone, etc.

The aerogel 212, being saturated with the first solvent 216 and further including hydrophilic pore structures, may undergo further processing such that desirable properties (e.g., thermal insulation, low weight, high specific surface area, etc.) may be realized. For instance, the aerogel 212 may be subjected to an ambient pressure drying process to evaporate the first solvent 216 therein. However, evaporation of the first solvent 216 in ambient pressures may result in increased surface tension during a liquid-to-gas phase transition, degrading and fracturing the porous network.

To mitigate structural degradation during the ambient pressure drying process, the first solvent 216 may be exchanged with a second solvent 217, the second solvent 217 having a lower surface tension during a liquid-to-gas phase transition. For example, the second solvent 217 may include a non-polar compound, such as hexane (e.g., n-hexane), benzene, carbon tetrachloride, diethyl ether, etc. Other options for the second solvent 217 may include toluene, cyclic alkanes, branched alkanes, further straightchain alkanes (e.g., in addition to or in place of n-hexane), etc. Additionally or alternatively, the second solvent 217 may include, or be substituted with, one or more surface modification reactants dispersed therein. In such examples, upon exchanging the first solvent 216 with the second solvent 217, the one or more surface modification reactants may react with hydrophilic functional groups on surfaces of the pore structures of the aerogel 212 to increase a hydrophobicity of the porous network.

The second solvent 217 may be injected into the first vessel 202 via a plurality of solvent injection ports. For example, and as shown in FIGS. 2A-2C, the plurality of solvent injection ports may include at least one primary solvent injection port and at least one secondary solvent injection port. In the reaction system 201 depicted by FIGS. 2A-2C, one primary solvent injection port 206 and two secondary solvent injection ports 219, 220 are shown. However, in other examples, other numbers of primary and secondary solvent injection ports may be employed.

The second solvent 217 may be injected into a volume of the first vessel 202 not occupied by the aerogel 212 (e.g., at a top surface 215 of the aerogel 212) via the primary solvent injection port 206. Further, the second solvent 217 may be directly injected 230, 231 into the base region 214 of the aerogel 212 via the secondary solvent injection ports 219, 220. Specifically, the secondary solvent injection ports 219, 220 may be positioned such that, when the aerogel 212 is packed relatively tightly within the narrow section 223 of the first vessel 202, the base region 214 may be directly adjacent to each of the secondary solvent injection ports 219, 220 with no or substantially no space therebetween.

A gas injection port 207 may further be fluidly coupled to the first vessel 202. The gas injection port 207 may inject an inert gas 226 into the volume of the first vessel 202 not occupied by the aerogel 212 and/or the second solvent 217. For example, the inert gas 226 may include one or more of nitrogen, helium, and argon gases. Other options for the inert gas 226 may include further noble gases (e.g., in addition to or in place of helium and/or argon gases). In one example, when the second solvent 217 has been injected into the first vessel 202 via the primary solvent injection port 206, the gas injection port 207 may then inject the inert gas 226 to apply a pressure at a gas-liquid interface 229 of the injected second solvent 217. The applied pressure may depend on a total amount of the inert gas 226 injected, a flow rate of the inert gas 226, and/or one or more properties of a selected composition of the inert gas 226, such as an overall density of the inert gas 226. Though in the reaction system 201 depicted by FIGS. 2A-2C only one gas injection port 207 is shown, in other examples, other numbers of gas injection ports may be employed.

A suction port 210 may further be fluidly coupled to the second vessel 204. The suction port 210 may generate a vacuum 227 in the second vessel 204. In one example, and as discussed in detail below, the pressure applied in the first vessel 202 by the gas injection port 207 and the vacuum 227 generated in the second vessel 204 by the suction port 210 may generate a pressure differential across the aerogel 212 (also referred to herein as a "vacuum-assisted pressure differential," as the pressure differential is at least partially generated via generation of the vacuum 227 in the second vessel 204). Though in the reaction system 201 depicted by FIGS. 2A-2C only one suction port 210 is shown, in other examples, other numbers of gas injection ports may be employed.

A plurality of valves may be included in the reaction system 201 to control flows of the various fluids (e.g., gases and liquids) entering and exiting the components of the reaction system 201. In some examples, one or more of the primary solvent injection port 206, the secondary solvent injection ports 219, 220, the gas injection port 207, and the suction port 210 may include a respective valve of the plurality of valves. In additional or alternative examples, the solvent recollection line 203 may include a further valve of the plurality of valves. As discussed in detail below, the plurality of valves may be independently or collectively opened such that the pressure differential is generated, the second solvent 217 flows 228 into the aerogel 212, and/or the first solvent 216 and/or the second solvent 217 flows 232 out of the aerogel 212.

For example, the primary solvent injection port 206 and the secondary solvent injection ports 219, 220 may respectively include valves 208, 221, and 222 for controlling flow of the second solvent 217 into the first vessel 202. As such, in some examples, each of the valves 208, 221, and 22 may be included in a plurality of solvent injection valves. In the schematic diagram 200 of FIG. 2A, for instance, the valve 208 of the primary solvent injection port 206 is depicted in a fully open position, permitting substantially free flow 218 (as represented in the schematic diagram 200 by a directional arrow) of the second solvent 217 into the first vessel 202. Further, the valves 221, 222 of the secondary solvent injection ports 219, 220 are depicted in the schematic diagram 200 in a fully closed position, such that flow of the second solvent 217 to the base region 214 of the aerogel 212 may be prevented.

Additionally or alternatively, the gas injection port 207 and the suction port 210 may respectively include valves 209 and 211 for controlling flow of gas (e.g., into the first vessel 202 and out of the second vessel 204, respectively), such that the pressure differential across the aerogel 212. As such, in some examples, each of the valves 209 and 211 may be included in a plurality of pressure differential valves. In the schematic diagram 200 of FIG. 2A, for instance, the valve 209 of the gas injection port 207 is depicted in a fully closed position, such that no pressure may be applied in the first vessel 202 (e.g., via flow of the inert gas 226). The valve 211 of the suction port 210 is also depicted in the schematic diagram 200 in a fully closed position, such that no vacuum 227 may be generated in the second vessel 204.

Additionally or alternatively, the solvent recollection line 203 may include a valve 205 for controlling flow of the first solvent 216 and/or the second solvent 217 into the second vessel 204 (e.g., during the vacuum-assisted solvent exchange process). In the schematic diagram 200 of FIG. 2A, for instance the valve 205 of the solvent recollection line 203 is depicted in a fully closed position, such that flow of the first solvent 216 and/or the second solvent 217 to the second vessel 204 may be prevented.

The valve 205 of the solvent recollection line 203 may be considered optional and is therefore depicted with dashing in the schematic diagrams 200, 225, 250. For example, the pressure differential generated by the pressure applied in the first vessel 202 via the gas injection port 207 and the vacuum 227 generated in the second vessel 204 via the suction port 210 may be controlled exclusively by the valves 209 and 211 (of the gas injection port 207 and the suction port 210, respectively). However, the valve 205 of the solvent recollection line 203 may, in some examples, provide additional precision in controlling flow rate(s) of the first solvent 216 and/or the second solvent 217 induced by the pressure differential.

For further precision, the plurality of valves may include one or more continuously variable valves. For example, the one or more continuously variable valves may be positioned in one or more of the gas injection port 207, the suction port 210, and the solvent recollection line 203 (e.g., the one or more continuously valves may include one or more of the valves 205, 209, 211). By adjusting the one or more continuously variable valves between the fully open position and the fully closed positions (e.g., along a continuum of partially open positions), a precise pressure differential may be generated. Accordingly, a magnitude of the pressure differential may be based on a position of at least some of the one or more continuously variable valves. Similarly, in additional or alternative examples wherein the one or more continuously variable valves are positioned in one or more of the primary and secondary solvent injection ports 206, 219, 220 (e.g., the one or more continuously variable valves may include one or more of the valves 208, 221, 222), flow of the second solvent 217 may be precisely controlled by adjusting the one or more continuously variable valves between the fully open position and the fully closed positions (e.g., along a continuum of partially open positions). Accordingly, a magnitude of flow of the second solvent 217 may be based on a position of at least some of the one or more continuously variable valves. In this way, both a speed and a duration of solvent exchange (and any associated surface modification reactions) may be precisely tuned via individual control of multiple flow paths, for example, via the plurality of valves including the one or more continuously variable valves. The speed and duration of solvent exchange may further depend on a magnitude of the applied pressure as a function of one or more properties of the inert gas 226 (e.g., density).

As discussed above, the schematic diagram 200 of FIG. 2A shows the second solvent 217 flowing 218 into the first vessel 202 by adjusting the valve 208 in the primary solvent injection port 206 to a partially or fully open position. After flowing 218 into the first vessel 202, the second solvent 217 may occupy at least a portion of the volume of the first vessel 202 not occupied by the aerogel 212. In some examples, the second solvent 217 may begin percolating into the aerogel 212 at the top surface 215, such that at least a small portion of the first solvent 216 may be displaced and forced out of a bottom surface 224 of the aerogel 212. In additional or alternative examples, an external pressure (e.g., from the gas injection port 207) may be employed to induce flow of the second solvent 217 into the aerogel 212.

For instance, and as shown in the schematic diagram 225 of FIG. 2B, the pressure differential may be applied across the aerogel 212. After injecting an amount of second solvent 217 at least sufficient to saturate the pores of the aerogel 212, the valve 208 of the primary solvent injection port 206 may be adjusted to a fully closed position, preventing further second solvent 217 from passing therethrough. The valve 209 of the gas injection port 207 may be adjusted to a partially or fully open position such that the inert gas 226 may flow into the volume of the first vessel 202 not occupied by either the aerogel 212 or the second solvent 217 (as represented in the schematic diagram 225 by a plurality of directional arrows). The inert gas 226 may apply the pressure at the gas-liquid interface 229 between the inert gas 226 and the second solvent 217 such that a flow rate of the second solvent 217 may be increased, inducing flow 228 of the second solvent 217 into the aerogel 212 (as represented in the schematic diagram 225 by a directional arrow).

To further increase the flow rate of the second solvent 217 and thereby induce flow 228 of the second solvent 217 into the aerogel 212, the valve 211 of the suction port 210 may be adjusted to a partially or fully open position such that the vacuum 227 may be generated in the second vessel 204 (as represented in the schematic diagram 225 by a plurality of directional arrows). Accordingly, a positive pressure applied by the inert gas 226 and a negative pressure generated by the vacuum 227 may generate the pressure differential across the aerogel 212, inducing flow 228 the second solvent 217 into the aerogel 212 (e.g., through the top surface 215) and inducing flow 232 of the first solvent 216 and/or the second solvent 217 out of the bottom surface (e.g., 224) of the aerogel 212 (as represented in the schematic diagram 225 by a directional arrow). In some examples, the valve 205 of the solvent recollection line 203 may further be adjusted to a partially or fully open position such that the pressure differential may be precisely adjusted and the first solvent 216 and/or the second solvent 217 may flow 232 through the solvent recollection line 203. In this way, continuous solvent exchange in an aerogel may be precisely controlled via a valve-actuated, vacuum-assisted pressure differential thereacross.

Because the applied pressure differential may, in some examples, remove the first solvent 216 from the aerogel 212 faster than replacement by the second solvent 217 may occur, pores in the base region 214 of the aerogel 212 may be prematurely dried. As a result, contraction and degradation of the porous network of the aerogel 212 may occur, hampering desirable properties thereof (such as low density, high specific surface area, etc.).

To maintain saturation of the base region 214 of the aerogel 212, the valves 221, 222 of the secondary solvent injection ports 219, 220 may be adjusted to a partially or fully open position such that the second solvent 217 may be directly injected 230, 231 into the base region 214 of the aerogel 212 (as represented in the schematic diagram 225 by a pair of directional arrows). Direct injection 230, 231 of the second solvent 217 into the base region 214 may occur substantially simultaneously with application of the pressure differential, such that saturation of any given region of the aerogel 212 may be maintained by the first solvent 216 and/or the second solvent 217.

In some examples, at least some of the second solvent 217 injected via the primary solvent injection port 206 and the secondary solvent injection ports 219, 220 may be induced out of the bottom surface (e.g., 224) of the aerogel 212 prior to substantially complete solvent exchange. Accordingly, a mixture 233 of the first solvent 216 and the second solvent 217 may exit the aerogel 212 and flow 232 to the second vessel 204. In other examples, substantially only the first solvent 216 may exit the aerogel 212 and flow 232 to the second vessel 204.

Upon determination that a threshold amount of the first solvent 216 has been exchanged with the second solvent 217, and as shown in the schematic diagram 250 of FIG. 2C, each of the plurality of valves may be adjusted to a fully closed position. As an example, each of the valves 208, 221, 222 of the primary and secondary solvent injection ports 206, 219, 220, respectively, may be adjusted to a fully closed position such that the second solvent 217 may be prevented from flowing into the first vessel 202. As an additional or alternative example, the valve 209 of the gas injection port 207 may be adjusted to a fully closed position such that the inert gas (e.g., 226) may be prevented from flowing into the first vessel 202. As an additional or alternative example, the valve 211 of the suction port 210 may be adjusted to a fully closed position such that generation of the vacuum (e.g., 227) in the second vessel 204 may be ceased. As an additional or alternative example, the valve 205 of the solvent recollection line 203 may be adjusted to a fully closed position such that the first solvent 216 and/or the second solvent 217 (e.g., the mixture 233) may be prevented from flowing into the second vessel 204.

Following the vacuum-assisted solvent exchange process, the pores of the aerogel 212 may be substantially saturated with the second solvent 217. Accordingly, in some examples, no or substantially no first solvent 216 may remain in the pores of the aerogel 212. In one example, only one iteration of the vacuum-assisted solvent exchange process may be sufficient to prepare the aerogel 212 for ambient pressure drying. Specifically, because the first solvent 216 may be substantially entirely replaced by the second solvent 217 (optionally carrying one or more surface modification reactants) in a single iteration, virtually no additional first solvent 216 may remain in the pores of the aerogel 212 to be exchanged.

As further shown in the schematic diagram 250 of FIG. 2C, the mixture 233 may be recollected in the second vessel 204, for example, for solvent recycling. Specifically, the mixture 233 may be reclaimed via distillation, such that the first solvent 216 may be separated from the second solvent 217, whereby the first solvent 216 may be reused for further aerogel saturation and the second solvent 217 may be reused for further vacuum-assisted solvent exchange. In this way, costs may be lowered for mass scale production of aerogels via vacuum-assisted solvent exchange and ambient pressure drying.

Referring now to FIG. 3, a flow chart of an example method 300 for leveraging vacuum-assisted solvent exchange and ambient pressure drying to process an aerogel for a vehicle component is shown. Specifically, a vacuum-assisted pressure differential may be generated across the aerogel such that solvent exchange of a first solvent saturating the aerogel for a second solvent may be facilitated (e.g., by increasing a flow rate of the second solvent into the aerogel and the first solvent out of the aerogel). In some examples, the exchanged first solvent may be reclaimed for further aerogel processing. Following the vacuum-assisted solvent exchange, the aerogel may be saturated with the second solvent, which may be selected for compatibility with ambient pressure drying (e.g., a relatively low surface tension may be generated during a liquid-to-gas phase transition during evaporation of the second solvent). The ambient-pressure dried aerogel may then be included in a vehicle component. In this way, mass scale processing of aerogels for vehicle components may be facilitated via an increased rate of solvent exchange and low-cost procedures and techniques, such as ambient pressure drying and solvent recycling. In some examples, a processing duration may be reduced by 50%, concomitantly increasing an overall processing productivity.

The method 300 may be described in relation to the components described in detail above with reference to FIGS. 1-2C. For example, the aerogel, the first solvent, and the second solvent may be the aerogel 212, the first solvent 216, and the second solvent 217 of FIGS. 2A-2C, respectively. However, components may be added or removed, or other components substituted, as may befit a particular application.

At 302, the method 300 may include positioning the aerogel (e.g., 212) saturated with the first solvent (e.g., 216) in a first vessel (e.g., 202). For example, the aerogel may be packed in the first vessel such that relatively few or substantially no gaps may be present between the aerogel and adjacent walls of the first vessel. The first solvent may include a compound, such as ethanol, having at least one hydrophilic functional group, such that a relatively high surface tension may be generated during a liquid-to-gas phase transition of the first solvent (e.g., during evaporation).

At 304, the method 300 may include injecting the second solvent (e.g., 217) into the first vessel (e.g., 202) via at least one primary solvent injection port (e.g., 206) fluidly coupled to the first vessel. For example, the second solvent may be injected into a volume of the first vessel not occupied by the aerogel. In one example, the second solvent may be injected at a top surface (e.g., 215) of the aerogel. The second solvent may include a compound, such as n-hexane, which may have a relatively low surface tension (e.g., lower than the corresponding surface tension of the first solvent) during a liquid-to-gas phase transition of the second solvent (e.g., during evaporation).

In some examples, the at least one primary solvent injection port (e.g., 206) may be actuated by adjusting respective valves (e.g., 208) therein to a partially or fully open position. In one example, each valve of the at least one primary solvent injection port may be a continuously variable valve.

At 306, the method 300 may include injecting the second solvent (e.g., 217) into a base (e.g., 214) of the aerogel (e.g., 212) via at least one secondary solvent injection port (e.g., 219, 220) fluidly coupled to the first vessel (e.g., 202). For example, the second solvent may be directly injected into the base of the aerogel (e.g., where no or substantially no space is present between the base of the aerogel and the at least one secondary solvent injection port). Accordingly, when the pressure differential is subsequently generated across the aerogel, solvent saturation of the base of the aerogel may be maintained.

In some examples, the at least one secondary solvent injection port (e.g., 219, 220) may be actuated by adjusting respective valves (e.g., 221, 222) therein to a partially or fully open position. In one example, each valve of the at least one secondary solvent injection port may be a continuously variable valve. In some examples, each valve of the at least one secondary solvent injection port may be opened substantially simultaneously to opening of each valve of the at least one primary solvent injection port at 304. In other examples, each valve of the at least one primary solvent injection port and the at least one secondary solvent injection port may be opened independently of one another.

At 308, the method 300 may optionally include opening a valve (e.g., 205) at a base (e.g., 214) of the aerogel (e.g., 212) (e.g., in embodiments where the valve at the base of the aerogel is included). For example, the valve may be included in a solvent recollection line (e.g., 203) fluidly coupling the first vessel (e.g., 202) to a second vessel (e.g., 204). Specifically, a flow path between the first vessel and the second vessel may be created by adjusting the valve of the solvent recollection line to a partially or fully open position. In one example, the valve of the solvent recollection line may be a continuously variable valve.

At 310, the method 300 may include generating the (vacuum-assisted) pressure differential across the aerogel (e.g., 212). Specifically, at 312, generating the pressure differential may include generating a vacuum (e.g., 227) in the second vessel (e.g., 204) fluidly coupled via the solvent recollection line (e.g., 203) to the first vessel (e.g., 202) at the base (e.g., 214) of the aerogel. For example, the vacuum may be generated by adjusting respective valves (e.g., 211) of at least one suction port (e.g., 210) fluidly coupled to the second vessel to a partially or fully open position. In one example, each valve of the at least one suction port may be a continuously variable valve.

At 314, generating the pressure differential may include applying a pressure to the first vessel (e.g., 202) to induce flow of the second solvent (e.g., 217) into the aerogel (e.g., 212). For example, the pressure may be applied in the form of an inert gas (e.g., 226) injected into the first vessel by adjusting respective valves (e.g., 209) of at least one gas injection port (e.g., 207) fluidly coupled to the first vessel to a partially or fully open position. In one example, each valve of the at least one gas injection port may be a continuously variable valve.

At 316, generating the pressure differential may include inducing flow of the first solvent (e.g., 216) out of the aerogel (e.g., 212). For example, as a result of generating the vacuum (e.g., 227) at 312 and applying the pressure at 314, the pressure differential may be applied across the aerogel such that the first solvent may flow out of the aerogel and may be replaced with the second solvent (e.g., 217). Accordingly, inducing flow of the first solvent out of the aerogel may occur substantially simultaneously with inducing flow of the second solvent into the aerogel at 314.

At 318, generating the pressure differential may include collecting the first solvent (e.g., 216) in the second vessel (e.g., 204). For example, after being induced out of the aerogel (e.g., 212) via application of the pressure differential thereacross, the first solvent may flow to the second vessel via the solvent recollection line (e.g., 203).

At 320, the method 300 may include determining whether the first solvent (e.g., 216) has been removed from the aerogel (e.g., 212). For example, determining whether the first solvent has been removed from the aerogel may include determining whether greater than a threshold amount of the first solvent has been removed from the aerogel. Specifically, the first solvent collected in the second vessel (e.g., 204) at 318 may be reclaimed (e.g., via distillation) to determine a total amount of the first solvent removed from the aerogel. Reclamation may be employed prior to determination of the total amount of the first solvent removed from the aerogel as at least some of the second solvent (e.g., 217) may further be removed as a result of the applied pressure differential, which may be separated from the first solvent for accurate determination of the total amount of the first solvent in the second vessel. Additionally or alternatively, the second vessel may be a vessel including measurement markings, such that a total amount of the first solvent removed from the aerogel may be estimated in real time (for example, a volume of a phase of the first solvent as distinct from a phase of the second solvent, the first and second solvents being mutually immiscible, may be estimated). In other examples, alternative but practically equivalent metric may be used, such as determining whether less than a threshold amount or concentration of the first solvent remains in the aerogel. If the first solvent is determined to have not yet been removed from the aerogel, then the method 300 may return to 310 to continue generating the pressure differential across the aerogel.

If the first solvent (e.g., 216) is determined to have been removed from the aerogel (e.g., 212), the method 300 may proceed to 322, where the method 300 may include closing all open valves. For example, where included, the valve (e.g., 205) of the solvent recollection line (e.g., 203), each valve (e.g., 208) of the at least one primary solvent injection port (e.g., 206), each valve of the at least one secondary solvent injection port (e.g., 219, 220), each valve (e.g., 209) of the at least one gas injection port (e.g., 207), and each valve (e.g., 211) of the at least one suction port (e.g., 210), if open, may be adjusted to a fully closed position. As such, each of generation of the pressure differential, injection of the second solvent (e.g., 217), and flow of the first solvent and/or the second solvent may cease.

At 324, the method 300 may optionally include reclaiming the first solvent (e.g., 216) from the second vessel (e.g., 204). For example, if additional aerogels are to be processed via the method 300, then the first solvent may be reclaimed for solvent recycling. In one example, the first solvent may be reclaimed via distillation, as at least some of the second solvent (e.g., 217) may also be collected in the second vessel during application of the pressure differential. In other examples, such as if no additional aerogels are to be processed, the first solvent collected in the second vessel may instead be dispensed with.

At 326, the method 300 may include drying the aerogel (e.g., 212) in ambient pressure. Because the first solvent (e.g., 216) initially saturating the aerogel may be substantially entirely replaced with the second solvent (e.g., 217), ambient pressure drying of the aerogel may be employed without substantial degradation or contraction of a porous network of the aerogel. Accordingly, the porous network of the aerogel may be maintained throughout processing thereof. In one example, ambient pressure may be a pressure of a processing environment (which may be controlled to be near standard atmospheric pressure, for example).

At 328, the method 300 may include manufacturing the vehicle component including the aerogel (e.g., 212) dried in ambient pressure at 326. The vehicle component may be a material or component of a vehicle which may be designed to improve thermal insulation. The aerogel processed as described above may facilitate such thermal insulation properties while simultaneously not significantly increasing an overall weight of the vehicle component. In some examples, the vehicle component may include an engine cover, a battery tray, a catalyst housing, or an applied coating.

The method 300 may be cycled to manufacture a plurality of vehicle components of like configuration on a mass scale, at least one of the plurality of vehicle components including the aerogel (e.g., 212) dried in ambient pressure at 326. For example, following execution of the steps of the method 300 to manufacture a first vehicle component including a (dried) first aerogel, a second vehicle component having a same configuration as the first vehicle component may be manufactured by repeating the steps of the method 300 with a second aerogel. Optionally, the first solvent reclaimed during processing of the first aerogel may be recycled for processing of the second aerogel.

In this way, systems and methods are provided for increasing a rate of aerogel processing for ambient pressure drying. In one example, a vacuum-assisted pressure differential is applied across an aerogel saturated with a first solvent, inducing flow of the first solvent out of the aerogel and flow of a second solvent into the aerogel. In some examples, the vacuum-assisted pressure differential may be generated via actuation of a plurality of pressure differential valves. Specifically, at least one of the plurality of pressure differential valves may be configured to apply a pressure at a first end of the aerogel and at least one of the plurality of pressure differential valves may be configured to generate a vacuum at a second end of the aerogel, the first end being opposite to the second end. A technical effect of generating the vacuum-assisted pressure differential via each of application of the pressure at the first end of the aerogel and generation of the vacuum at the second end of the aerogel is that the flows of the first and second solvents may be increased and controlled with greater precision. In some examples, a plurality of solvent injection ports may be configured to inject the second solvent both onto a top surface of the aerogel and directly into a base of the aerogel. A technical effect of injecting the solvent both onto the top surface of the aerogel and directly into the base of the aerogel is that solvent saturation may be maintained prior to ambient pressure drying.

In one example, a method for processing an aerogel saturated with a first solvent, the method comprising injecting a second solvent at each of a top surface and a base of the aerogel, and applying a vacuum-assisted pressure differential across the aerogel to exchange the first solvent with the second solvent. A first example of the method further comprises recollecting the exchanged first solvent for solvent recycling. A second example of the method, optionally including the first example of the method, further includes wherein injecting the second solvent at the base of the aerogel comprises opening a plurality of solvent injection valves, and wherein applying the vacuum-assisted pressure differential comprises opening a plurality of pressure differential valves. A third example of the method, optionally including one or more of the first and second examples of the method, further comprises, responsive to a threshold amount of the first solvent being exchanged with the second solvent, closing the plurality of solvent injection valves and the plurality of pressure differential valves. A fourth example of the method, optionally including one or more of the first through third examples of the method, further comprises, following applying the vacuum-assisted pressure differential across the aerogel, drying the aerogel in ambient pressure.

As another example, a system, comprising a first vessel containing an aerogel permeated with a first solvent, a second vessel fluidly coupled to the first vessel via a solvent recollection line, and a plurality of solvent injection ports fluidly coupled to the first vessel, the plurality of solvent injection ports configured to inject a second solvent into the first vessel, wherein a vacuum-assisted pressure differential is generated across the aerogel to induce flow of the second solvent into the aerogel and the first solvent out of the aerogel. A first example of the system further comprises a gas injection port fluidly coupled to the first vessel, the gas injection port configured to, upon injection of the second solvent into the first vessel, apply a pressure at a gas-liquid interface of the injected second solvent, and a suction port fluidly coupled to the second vessel, the suction port configured to generate a vacuum in the second vessel, wherein the vacuum-assisted pressure differential is generated as a result of a difference between the pressure and the vacuum. A second example of the system, optionally including the first example of the system, further includes wherein each of the plurality of solvent injection ports, the gas injection port, and the suction port includes a respective valve of a plurality of valves, and wherein, upon collectively opening the plurality of valves, the vacuum-assisted pressure differential is generated, the second solvent flows into the aerogel, and the first solvent flows out of the aerogel. A third example of the system, optionally including one or more of the first and second examples of the system, further includes wherein the solvent recollection line includes a further valve of the plurality of valves, the valve of the solvent recollection line being open when the vacuum-assisted pressure differential is generated. A fourth example of the system, optionally including one or more of the first through third examples of the system, further includes wherein the plurality of valves comprises one or more continuously variable valves. A fifth example of the system, optionally including one or more of the first through fourth examples of the system, further includes wherein the one or more continuously variable valves are positioned in one or more of the gas injection port, the suction port, and the solvent recollection line, and wherein a magnitude of the vacuum-assisted pressure differential is based on a position of each of the one or more continuously variable valves. A sixth example of the system, optionally including one or more of the first through fifth examples of the system, further includes wherein the plurality of solvent injection ports comprises at least one primary solvent injection port and at least one secondary solvent injection port, wherein the at least one primary solvent injection port injects the second solvent into a volume of the first vessel not occupied by the aerogel, and wherein the at least one secondary solvent injection port injects the second solvent directly into a base region of the aerogel. A seventh example of the system, optionally including one or more of the first through sixth examples of the system, further includes wherein the second solvent is hydrophobic and the first solvent has at least one hydrophilic functional group. An eighth example of the system, optionally including one or more of the first through seventh examples of the system, further includes wherein the second solvent is hexane and the first solvent is ethanol. A ninth example of the system, optionally including one or more of the first through eighth examples of the system, further includes wherein a surface modification reactant is dispersed in the second solvent, the surface modification reactant reacting with hydrophilic functional groups of the aerogel upon flowing the second solvent into the aerogel.

As yet another example, a production method, comprising exchanging a first solvent permeating pores of a first aerogel for a second solvent via application of a vacuum-assisted pressure differential across the first aerogel, drying the first aerogel in ambient pressure, and manufacturing a first vehicle component including the dried first aerogel, wherein solvent saturation at a base of the first aerogel is maintained during the exchange of the first solvent permeating the pores of the first aerogel for the second solvent. A first example of the production method further includes wherein the first vehicle component is an engine cover, a battery tray, a catalyst housing, or an applied coating. A second example of the production method, optionally including the first example of the production method, further comprises reclaiming the exchanged first solvent for further aerogel saturation. A third example of the production method, optionally including one or more of the first and second examples of the production method, further comprises permeating pores of a second aerogel with at least the reclaimed first solvent, exchanging the reclaimed first solvent permeating the pores of the second aerogel for the second solvent via application of the vacuum-assisted pressure differential across the second aerogel, drying the second aerogel in ambient pressure, and manufacturing a second vehicle component including the dried second aerogel, wherein solvent saturation at a base of the second aerogel is maintained during the exchange of the reclaimed first solvent permeating the pores of the second aerogel for the second solvent. A fourth example of the production method, optionally including one or more of the first through third examples of the production method, further includes wherein the second vehicle component has a same configuration as the first vehicle component.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for processing an aerogel saturated with a first solvent, the method comprising:
   injecting a second solvent at each of a top surface and a base of the aerogel; and
   applying a vacuum-assisted pressure differential across the aerogel to exchange the first solvent with the second solvent.

2. The method of claim 1, further comprising recollecting the exchanged first solvent for solvent recycling.

3. The method of claim 1, wherein injecting the second solvent at the base of the aerogel comprises opening a plurality of solvent injection valves, and
   wherein applying the vacuum-assisted pressure differential comprises opening a plurality of pressure differential valves.

4. The method of claim 3, further comprising, responsive to a threshold amount of the first solvent being exchanged with the second solvent, closing the plurality of solvent injection valves and the plurality of pressure differential valves.

5. The method of claim 1, further comprising, following applying the vacuum-assisted pressure differential across the aerogel, drying the aerogel in ambient pressure.

6. A system, comprising:
   a first vessel containing an aerogel permeated with a first solvent;
   a second vessel fluidly coupled to the first vessel via a solvent recollection line; and
   a plurality of solvent injection ports fluidly coupled to the first vessel, the plurality of solvent injection ports configured to inject a second solvent into the first vessel,
   wherein a vacuum-assisted pressure differential is generated across the aerogel to induce flow of the second solvent into the aerogel and the first solvent out of the aerogel.

7. The system of claim 6, further comprising:
   a gas injection port fluidly coupled to the first vessel, the gas injection port configured to, upon injection of the second solvent into the first vessel, apply a pressure at a gas-liquid interface of the injected second solvent; and
   a suction port fluidly coupled to the second vessel, the suction port configured to generate a vacuum in the second vessel,
   wherein the vacuum-assisted pressure differential is generated as a result of a difference between the pressure and the vacuum.

8. The system of claim 7, wherein each of the plurality of solvent injection ports, the gas injection port, and the suction port includes a respective valve of a plurality of valves, and
   wherein, upon collectively opening the plurality of valves, the vacuum-assisted pressure differential is generated, the second solvent flows into the aerogel, and the first solvent flows out of the aerogel.

9. The system of claim 8, wherein the solvent recollection line includes a further valve of the plurality of valves, the valve of the solvent recollection line being open when the vacuum-assisted pressure differential is generated.

10. The system of claim 9, wherein the plurality of valves comprises one or more continuously variable valves.

11. The system of claim 10, wherein the one or more continuously variable valves are positioned in one or more of the gas injection port, the suction port, and the solvent recollection line, and
    wherein a magnitude of the vacuum-assisted pressure differential is based on a position of each of the one or more continuously variable valves.

12. The system of claim 6, wherein the plurality of solvent injection ports comprises at least one primary solvent injection port and at least one secondary solvent injection port,
    wherein the at least one primary solvent injection port injects the second solvent into a volume of the first vessel not occupied by the aerogel, and
    wherein the at least one secondary solvent injection port injects the second solvent directly into a base region of the aerogel.

13. The system of claim 6, wherein the second solvent is hydrophobic and the first solvent has at least one hydrophilic functional group.

14. The system of claim 13, wherein the second solvent is hexane and the first solvent is ethanol.

15. The system of claim 6, wherein a surface modification reactant is dispersed in the second solvent, the surface modification reactant reacting with hydrophilic functional groups of the aerogel upon flowing the second solvent into the aerogel.

16. A production method, comprising:
    exchanging a first solvent permeating pores of a first aerogel for a second solvent via application of a vacuum-assisted pressure differential across the first aerogel;
    drying the first aerogel in ambient pressure; and
    manufacturing a first vehicle component including the dried first aerogel,
    wherein solvent saturation at a base of the first aerogel is maintained during the exchange of the first solvent permeating the pores of the first aerogel for the second solvent.

17. The production method of claim 16, wherein the first vehicle component is an engine cover, a battery tray, a catalyst housing, or an applied coating.

18. The production method of claim 16, further comprising reclaiming the exchanged first solvent for further aerogel saturation.

19. The production method of claim 18, further comprising:
    permeating pores of a second aerogel with at least the reclaimed first solvent;

exchanging the reclaimed first solvent permeating the pores of the second aerogel for the second solvent via application of the vacuum-assisted pressure differential across the second aerogel;
drying the second aerogel in ambient pressure; and
manufacturing a second vehicle component including the dried second aerogel,
wherein solvent saturation at a base of the second aerogel is maintained during the exchange of the reclaimed first solvent permeating the pores of the second aerogel for the second solvent.

20. The production method of claim 19, wherein the second vehicle component has a same configuration as the first vehicle component.

* * * * *